US012691950B2

(12) United States Patent
Jeong et al.

(10) Patent No.: US 12,691,950 B2
(45) Date of Patent: Jul. 28, 2026

(54) ELECTRIC VEHICLE STRUCTURE

(71) Applicants: Hyundai Motor Company, Seoul
(KR); Kia Corporation, Seoul (KR)

(72) Inventors: Seung Min Jeong, Hwaseong-si (KR);
Joo Nam Kim, Seoul (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 282 days.

(21) Appl. No.: 18/657,234

(22) Filed: May 7, 2024

(65) Prior Publication Data

US 2025/0136190 A1     May 1, 2025

(30) Foreign Application Priority Data

Oct. 31, 2023     (KR) ........................ 10-2023-0148287

(51) Int. Cl.
*B62D 25/20*     (2006.01)
*B60L 50/60*     (2019.01)

(52) U.S. Cl.
CPC .............. *B62D 25/20* (2013.01); *B60L 50/66*
(2019.02)

(58) Field of Classification Search
CPC ................................ B62D 25/20; B60L 50/66
See application file for complete search history.

(56) References Cited

U.S. PATENT DOCUMENTS

| | | | | |
|---|---|---|---|---|
| 11,186,317 | B2 * | 11/2021 | Grattan | ................ B62D 21/157 |
| 2010/0066125 | A1 * | 3/2010 | Egawa | ............... B62D 25/2036 |
| | | | | 296/193.07 |
| 2015/0239331 | A1 * | 8/2015 | Rawlinson | ........... B62D 21/157 |
| | | | | 180/68.5 |
| 2017/0305250 | A1 * | 10/2017 | Hara | .................... H01M 50/204 |
| 2018/0151857 | A1 | 5/2018 | Gang et al. | |
| 2020/0075907 | A1 | 3/2020 | Shimazaki et al. | |
| 2021/0094626 | A1 * | 4/2021 | Kimura | ................ B62D 27/065 |

FOREIGN PATENT DOCUMENTS

| | | |
|---|---|---|
| CN | 109216616 A | 1/2019 |
| EP | 3345779 A1 | 7/2018 |
| JP | 6743098 B2 | 8/2020 |
| JP | 2022155479 A | 10/2022 |
| KR | 20180060820 A | 6/2018 |
| KR | 20200063396 A | 6/2020 |
| KR | 20220126132 A | 9/2022 |
| KR | 20230088579 A | 6/2023 |

* cited by examiner

*Primary Examiner* — Edwin A Young
(74) *Attorney, Agent, or Firm* — Slater Matsil, LLP

(57) ABSTRACT
An electric vehicle structure includes a floor panel including
upper and lower side walls spaced apart from each other, the
floor panel being configured to cover an upper side of a
battery accommodation space, side sills coupled to two
opposite ends of the floor panel to define the battery accom-
modation space, floor drain holes extending through the
upper side wall of the floor panel, and side sill drain holes
disposed in the side sills and configured to communicate
with a space between the upper and lower side walls of the
floor panel.

20 Claims, 7 Drawing Sheets

ELECTRIC VEHICLE STRUCTURE

CROSS-REFERENCE TO RELATED APPLICATIONS

This application claims the benefit of Korean Patent Application No. 10-2023-0148287, filed on Oct. 31, 2023, which application is hereby incorporated herein by reference.

TECHNICAL FIELD

The present disclosure relates to a technology related to a vehicle body structure for an electric vehicle equipped with a battery.

BACKGROUND

An electric vehicle is configured to travel by operating a motor by using electricity provided by a battery mounted in the vehicle.

Therefore, a traveling distance of the vehicle greatly depends on an energy storage capacity of the battery mounted in the vehicle.

A major issue in the development of the electric vehicle is to mount the battery, which may store electrical energy as much as possible, in the vehicle and ensure performance in coping with various types of collisions that is required for the vehicle.

Recently, a cell-to-body (CTB) type vehicle structure having battery cells mounted directly in a vehicle body has been developed to increase the number of battery cells mounted in the vehicle.

In this manner, a battery accommodation space is provided so that the battery cells are positioned immediately below a floor panel of the vehicle body. Therefore, the floor panel has a structure that completely seals an upper side of the battery accommodation space.

However, there is a problem in that it is difficult to drain a coating liquid from the floor panel, which has the structure that completely seals the upper side of the battery accommodation space as described above, during an electrocoating process in which the vehicle body passes through an electrodeposition tank so as to be coated.

The foregoing explained as background information is intended merely to aid in the understanding of the background of embodiments of the present disclosure, and it is not intended to mean that the information forms the prior art available to the public.

SUMMARY

Accordingly, embodiments of the present disclosure have been made keeping in mind problems occurring in the related art, and embodiments of the present disclosure provide an electric vehicle structure capable of allowing a liquid material such as a coating liquid to be appropriately drained toward a lower side of a floor panel of a vehicle body, which has the floor panel having a battery accommodation space formed at the lower side thereof, thereby performing a smooth coating process.

According to one embodiment, there is provided an electric vehicle structure including a floor panel having upper and lower side walls spaced apart from each other, the floor panel being configured to cover an upper side of a battery accommodation space, side sills coupled to two opposite ends of the floor panel to define the battery accommodation space, floor drain holes formed through the upper side wall of the floor panel, and side sill drain holes formed in the side sills and configured to communicate with a space between the upper and lower side walls of the floor panel.

The upper side wall of the floor panel may include a basic panel portion and a protruding panel portion protruding upward further than the basic panel portion, and the floor drain hole may be formed in the basic panel portion.

The floor panel may be configured by connecting a plurality of partial panels, which has the basic panel portion and the protruding panel portion, in a forward/rearward direction of a vehicle body, and at least one of the two partial panels connected to each other may have the basic panel portion connected to another partial panel.

The floor drain hole may be formed in the basic panel portion positioned on a connection portion between the two partial panels connected to each other.

The side sill drain holes formed in the side sill may be provided as a plurality of side sill drain holes, and one or more of the side sill drain holes may communicate with the outside of a vehicle body.

The side sill drain holes, which communicate with the outside of the vehicle body, may include one or more of lateral drain holes penetratively formed in a transverse direction of the vehicle body and lower drain holes penetratively formed downward.

The side sill may have a cross-sectional structure having a plurality of ribs, and the side sill drain holes may be formed through all the ribs of the side sill to allow the space between the upper and lower side walls of the floor panel to communicate with the lateral drain holes or the lower drain holes.

The side sill may have a cross-sectional structure including a plurality of vertical ribs and a plurality of horizontal ribs, an upper surface of a horizontal intermediate rib, which is one of the horizontal ribs, may be coupled to a lower surface of the lower side wall of the floor panel, and the side sill drain holes may be formed, in a horizontal direction, through the plurality of vertical ribs connected to the upper surface of the horizontal intermediate rib.

An integrated battery front cross member may be provided at a front side of the floor panel and cover a front side of the battery accommodation space, an integrated battery rear cross member may be provided at a rear side of the floor panel and cover a rear side of the battery accommodation space, and a battery lower module may be provided below the integrated battery front cross member, the integrated battery rear cross member, and the side sill and cover a lower side of the battery accommodation space.

The floor panel may be configured by connecting a plurality of partial panels, which is made of an extruded material, in a forward/rearward direction of a vehicle body, the integrated battery front cross member may be integrated with the partial panel at the foremost side among the plurality of partial panels, and the integrated battery rear cross member may be integrated with the partial panel at the rearmost side among the plurality of partial panels.

The battery lower module may include a lower plate configured to cover the lower side of the battery accommodation space, a lower module outer peripheral front cross member coupled to an upper side of the lower plate and coupled to a lower side of the integrated battery front cross member, a lower module outer peripheral rear cross member coupled to the upper side of the lower plate and coupled to a lower side of the integrated battery rear cross member, and a lower module outer peripheral side member coupled to the upper side of the lower plate and coupled to a lower side of the side sill.

The battery lower module may be coupled in a state in which a gasket is interposed between the integrated battery front cross member, the integrated battery rear cross member, and the side sill.

The floor panel may have a structure having a cross-sectional shape having a plurality of partition walls, which connects the upper side wall and the lower side wall, and elongated in a transverse direction of a vehicle body.

According to embodiments of the present disclosure, the liquid material, such as a coating liquid, may be appropriately drained toward the lower side of the floor panel of the vehicle body, which has the floor panel having the battery accommodation space formed at the lower side thereof, thereby performing a smooth coating process.

DETAILED DESCRIPTION OF ILLUSTRATIVE EMBODIMENTS

Figure 1:
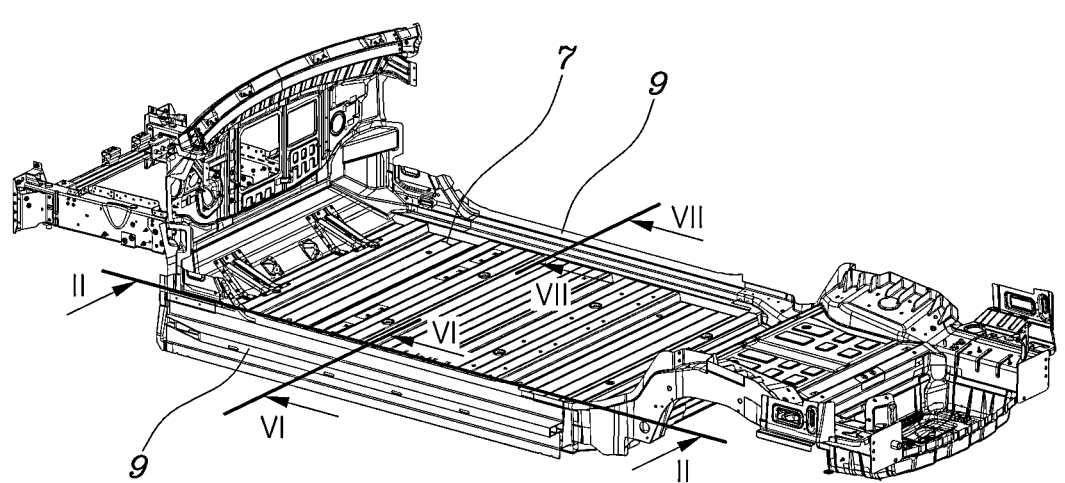
FIG. 1 is a view illustrating an electric vehicle structure according to an embodiment of the present disclosure.

Hereinafter, embodiments disclosed in the present specification will be described in detail with reference to the accompanying drawings. The same or similar constituent elements are assigned with the same reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as having different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Figure 2:
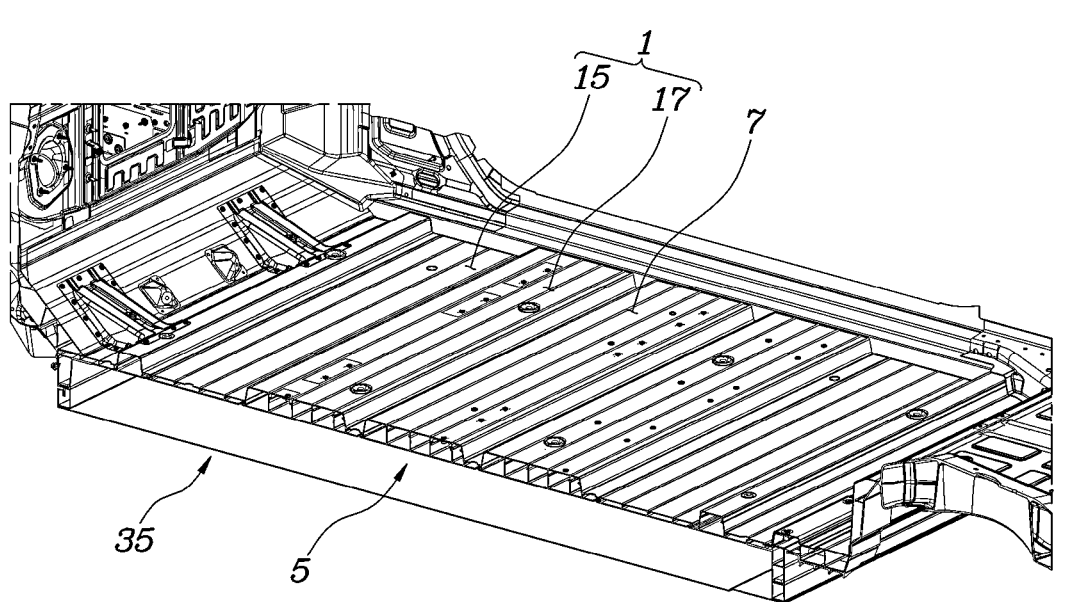
FIG. 2 is a cross-sectional view taken along line II-II in FIG. 1.
Figure 3:
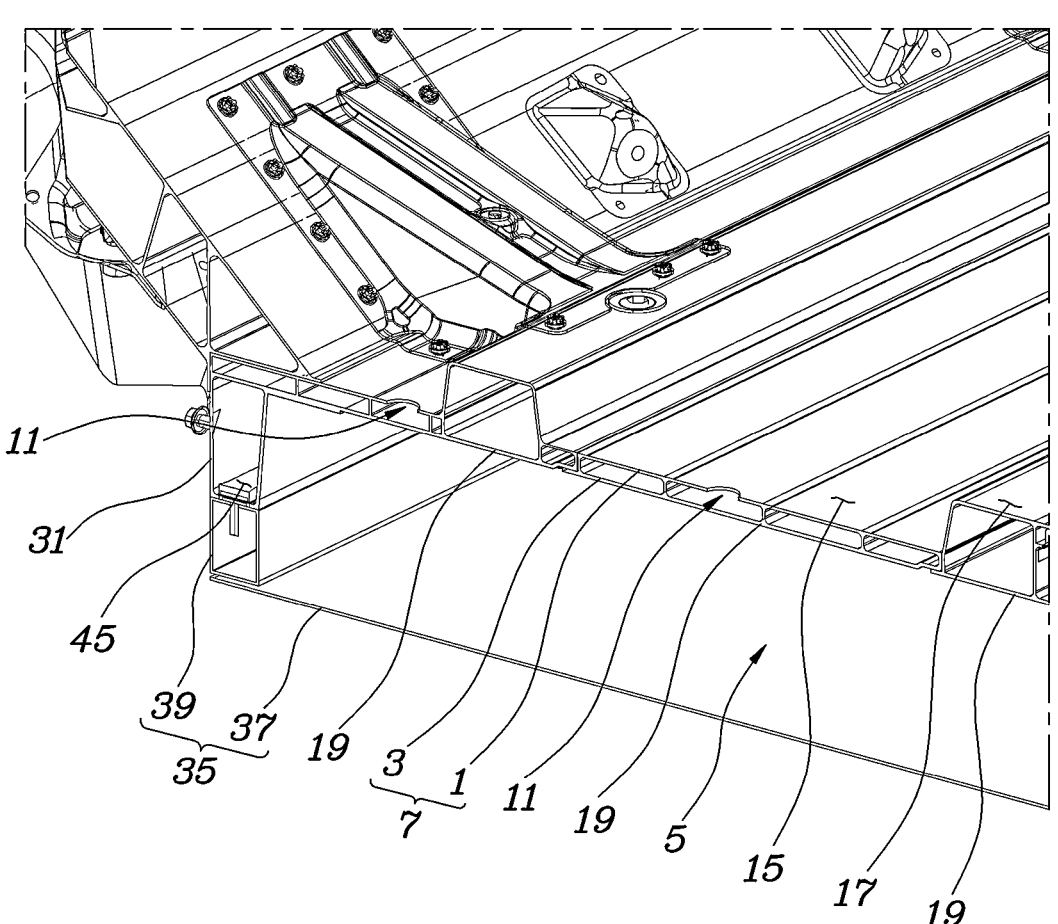
FIG. 3 is a detailed view illustrating a front side of a floor panel in FIG. 2.
Figure 4:
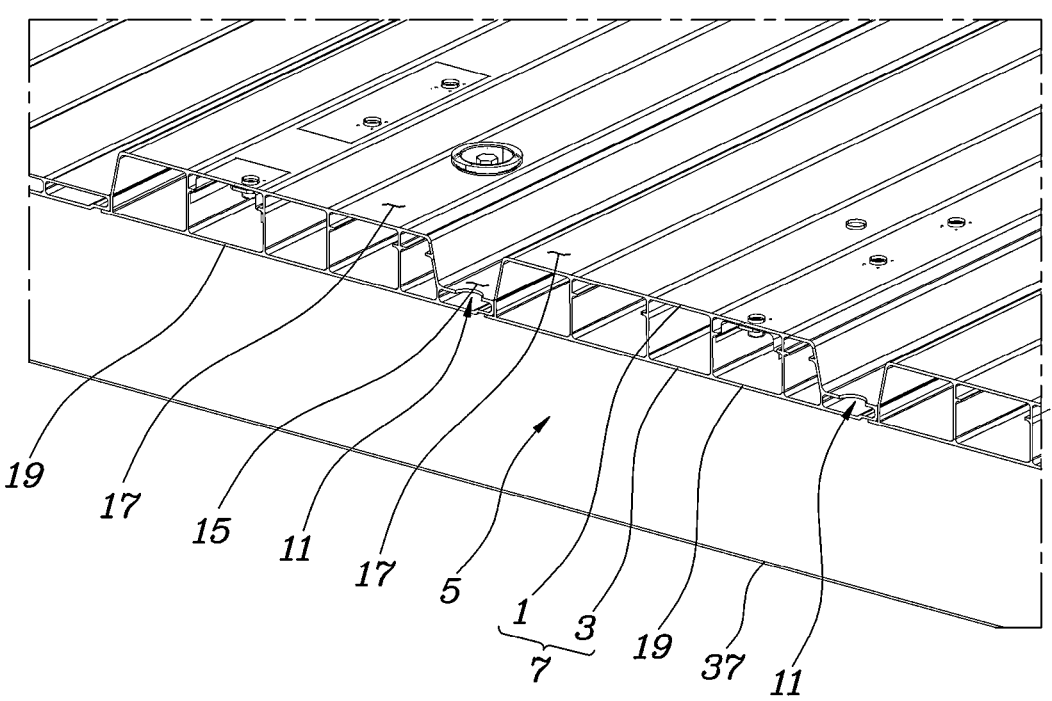
FIG. 4 is a detailed view illustrating a center side of the floor panel in FIG. 2.
Figure 5:
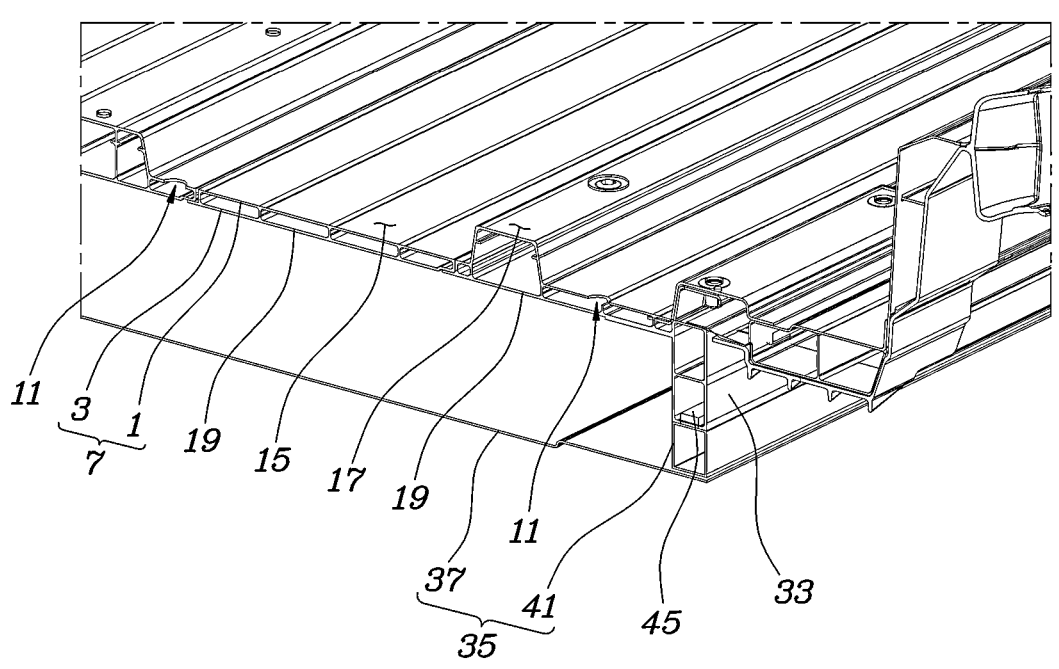
FIG. 5 is a detailed view illustrating a rear side of the floor panel in FIG. 2.
Figure 6:
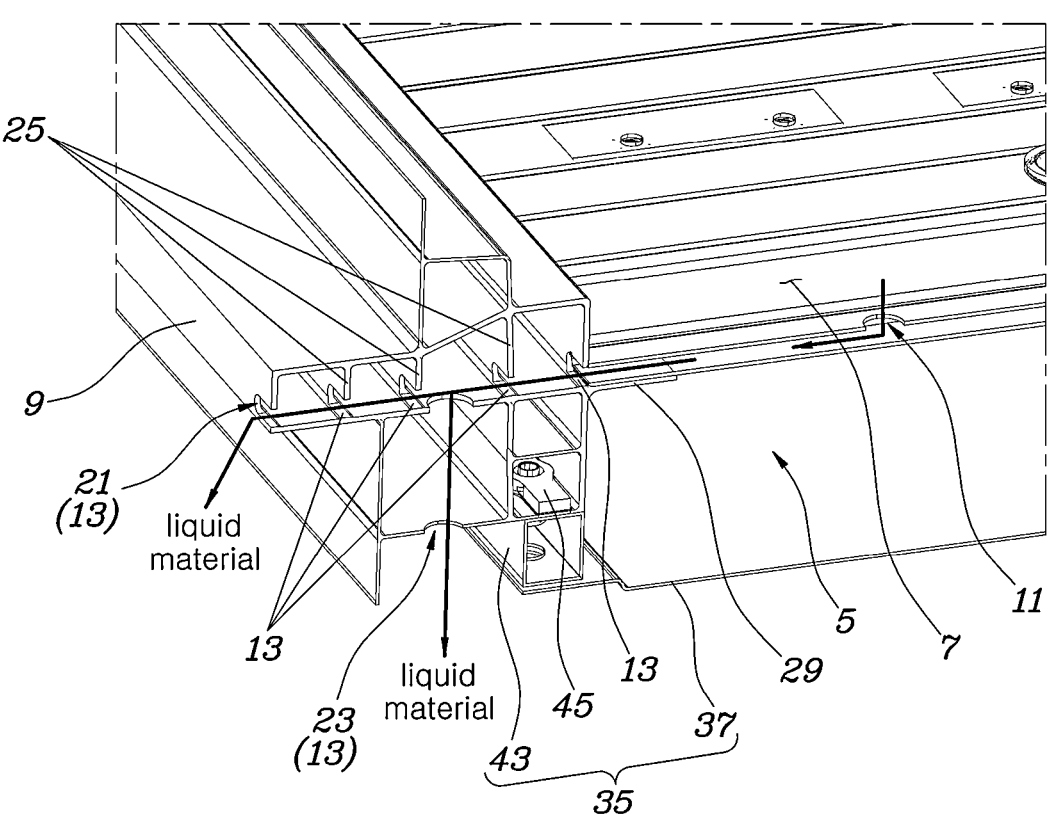
FIG. 6 is a cross-sectional view taken along line VI-VI in FIG. 1.
Figure 7:
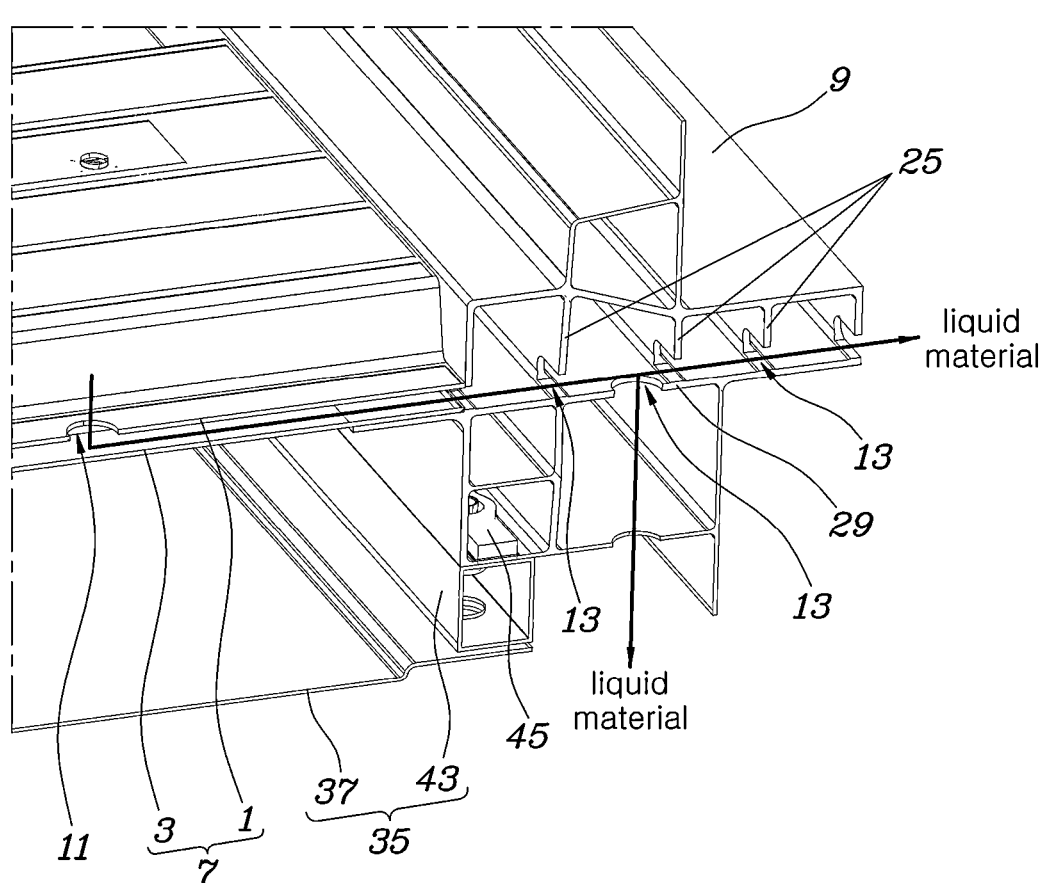
FIG. 7 is a cross-sectional view taken along line VII-VII in FIG. 1.

With reference to FIGS. 1 to 7, an electric vehicle structure according to an embodiment of the present disclosure includes a floor panel 7 having upper and lower side walls 1 and 3, which are spaced apart from each other, and configured to cover an upper side of a battery accommodation space 5, side sills 9 coupled to two opposite ends of the floor panel 7 to define the battery accommodation space 5, floor drain holes 11 formed to penetrate the upper side wall 1 of the floor panel 7, and side sill drain holes 13 formed in the side sills 9 to communicate with spaces between the upper and lower side walls 1 and 3 of the floor panel 7.

That is, a plurality of battery cells mounted in a vehicle is accommodated in the battery accommodation space 5. The upper side and the two opposite sides of the battery accommodation space 5 are covered by the floor panel 7 and the side sills 9. The floor drain holes 11 may be formed in the upper side wall 1 constituting the floor panel 7, such that a liquid material, such as a coating liquid, present at the upper side of the floor panel 7 may flow through the floor drain holes 11. The side sill drain holes 13 may be formed in the side sills 9 coupled to the floor panel 7, such that the liquid material flowing through the floor drain holes 11 may be eventually drained to the outside of the vehicle body through the side sill drain holes 13.

The upper side wall 1 of the floor panel 7 includes basic panel portions 15 and protruding panel portions 17 protruding upward further than the basic panel portions 15, and the floor drain holes 11 are formed in the basic panel portions 15.

That is, the upper side wall 1 of the floor panel 7 has two heights. The protruding panel portion 17 protrudes upward further than the basic panel portion 15 and has a relatively high height, and the floor drain hole 11 is formed in the basic panel portion 15 having a relatively low height.

Therefore, as a result, in a configuration in which the floor panel 7 has the protruding panel portions 17 and the basic panel portions 15 as described above, the basic panel portion 15 defines a trough between the two protruding panel portions 17, and the floor drain hole 11 is formed in the basic panel portion 15 that defines the trough.

Therefore, the liquid material flows downward from the protruding panel portion 17 of the floor panel 7 and enters the basic panel portion 15 that defines the trough, and the liquid material flows downward through the floor drain hole 11 of the basic panel portion 15.

The floor panel 7 is configured by connecting a plurality of partial panels 19, which has the basic panel portion 15 and the protruding panel portion 17, in a forward/rearward direction of the vehicle body. At least one of the two partial panels 19 connected to each other may have a structure in which the basic panel portion 15 is connected to another partial panel 19.

In this case, the floor drain hole 11 is formed in the basic panel portion 15 positioned on a connection portion between the two partial panels 19 connected to each other.

The partial panel 19 may be configured as an extruded material having a cross-sectional shape having a plurality of partition walls, which connects the upper side wall 1 and the lower side wall 3, and elongated in a transverse direction of the vehicle body. The floor panel 7 may be formed by coupling the partial panels 19.

Meanwhile, the plurality of side sill drain holes 13 is formed in the side sills 9. One or more of the side sill drain holes 13 communicate with the outside of the vehicle body.

The side sill drain holes 13, which communicate with the outside of the vehicle body, include one or more of lateral drain holes 21 penetratively formed in the transverse direction of the vehicle body and lower drain holes 23 penetratively formed downward.

Therefore, the liquid material flowing downward through the floor drain holes 11 of the floor panel 7 is eventually drained to the outside of the vehicle body through one or more of the lateral drain holes 21 and the lower drain holes 23.

In the present embodiment, the side sill 9 has a cross-sectional structure having a plurality of ribs. The side sill drain holes 13 are formed through all the ribs of the side sill 9 to allow the space between the upper and lower side walls 1 and 3 of the floor panel 7 to communicate with the lateral drain holes 21 or the lower drain holes 23.

That is, the side sill 9 has a cross-sectional structure including a plurality of vertical ribs 25 and a plurality of horizontal ribs 27. An upper surface of a horizontal intermediate rib 29, which is one of the horizontal ribs 27, is coupled to a lower surface of the lower side wall 3 of the floor panel 7, and the side sill drain holes 13 are formed, in a horizontal direction, through the plurality of vertical ribs 25 connected to the upper surface of the horizontal intermediate rib 29.

Therefore, the liquid material introduced into the floor drain holes 11 flows along the space between the upper side wall 1 and the lower side wall 3, passes through the side sill drain holes 13 at the upper sides of the horizontal intermediate ribs 29 and the upper surface of the horizontal intermediate rib 29, and is drained to the outside through the lateral drain holes 21 or the lower drain holes 23.

The liquid material, such as a coating liquid, present at the upper side of the floor panel 7 may be easily and smoothly drained to the outside of the vehicle body through the floor drain holes 11 and the side sill drain holes 13, such that a process, such as an electrocoating process, may be smoothly performed.

Meanwhile, an integrated battery front cross member 31 is provided at a front side of the floor panel 7 and covers a front side of the battery accommodation space 5. An integrated battery rear cross member 33 is provided at a rear side of the floor panel 7 and covers a rear side of the battery accommodation space 5. A battery lower module 35 is provided below the integrated battery front cross member 31, the integrated battery rear cross member 33, and the side sill 9 and covers a lower side of the battery accommodation space 5.

The floor panel 7 is configured by connecting the plurality of partial panels 19, which is made of an extruded material, in the forward/rearward direction of the vehicle body. The partial panel 19, which is disposed at the foremost side among the plurality of partial panels 19, may be integrated with the integrated battery front cross member 31. The partial panel 19, which is disposed at the rearmost side among the plurality of partial panels 19, may be integrated with the integrated battery rear cross member 33.

Therefore, a process of coupling the integrated battery front cross member 31 and the floor panel 7 and a process of coupling the integrated battery rear cross member 33 and the floor panel 7 may be excluded, such that watertightness performance required therebetween may be ensured basically, and the structural rigidity of the floor panel 7 may be improved.

The battery lower module 35 includes a lower plate 37 configured to cover the lower side of the battery accommodation space 5, a lower module outer peripheral front cross member 39 coupled to an upper side of the lower plate 37 and coupled to a lower side of the integrated battery front cross member 31, a lower module outer peripheral rear cross member 41 coupled to the upper side of the lower plate 37 and coupled to a lower side of the integrated battery rear cross member 33, and a lower module outer peripheral side member 43 coupled to the upper side of the lower plate 37 and coupled to a lower side of the side sill 9.

The battery lower module 35 is coupled in a state in which a gasket 45 is interposed between the integrated battery front cross member 31, the integrated battery rear cross member 33, and the side sill 9.

Therefore, the battery accommodation space 5 may have the structure completely sealed by the floor panel 7 at the upper side, the battery lower module 35 at the lower side, the integrated battery front cross member 31 at the front side, and the integrated battery rear cross member 33 at the rear side, such that the battery cells accommodated in the battery accommodation space 5 may be safely protected.

For reference, the gasket 45 is compressed between the integrated battery front cross member 31, the integrated battery rear cross member 33, the lower side of the side sill 9, the upper sides of the lower module outer peripheral front cross member 39, the lower module outer peripheral rear cross member 41, and the lower module outer peripheral side member 43 of the battery lower module 35. However, because it is difficult to illustrate this configuration in the drawings, a state in which the gasket 45 protrudes upward while penetrating the lower sides of the integrated battery front cross member 31, the integrated battery rear cross member 33, and the side sill 9 is illustrated.

While the specific embodiments of the present disclosure have been illustrated and described, it will be obvious to those skilled in the art that the embodiments of the present disclosure may be variously modified and changed without departing from the technical spirit of the present disclosure defined in the appended claims.

What is claimed is:

1. An electric vehicle structure comprising:
   a floor panel comprising upper and lower side walls spaced apart from each other, the floor panel being configured to cover an upper side of a battery accommodation space;
   side sills coupled to two opposite ends of the floor panel to define the battery accommodation space;
   floor drain holes extending through the upper side wall of the floor panel; and side sill drain holes disposed in the side sills and configured to communicate with a space between the upper and lower side walls of the floor panel.

2. The electric vehicle structure of claim 1, wherein the upper side wall of the floor panel comprises:

a basic panel portion; and a protruding panel portion protruding upward further than the basic panel portion.

3. The electric vehicle structure of claim 2, wherein the floor drain holes are disposed in the basic panel portion.

4. The electric vehicle structure of claim 2, wherein:

the floor panel is configured by connecting a plurality of partial panels, comprising the basic panel portion and the protruding panel portion, in a forward/rearward direction of a vehicle body; and at least one of two partial panels of the plurality of partial panels connected to each other has the basic panel portion connected to another partial panel of the plurality of partial panels.

5. The electric vehicle structure of claim 4, wherein the floor drain holes are disposed in the basic panel portion positioned on a connection portion between the two partial panels connected to each other.

6. The electric vehicle structure of claim 1, wherein at least one of the side sill drain holes communicates with an outside of a vehicle body.

7. The electric vehicle structure of claim 6, wherein a plurality of the side sill drain holes communicates with the outside of the vehicle body, and wherein the plurality of the side sill drain holes comprises a lateral drain hole penetratively disposed in a transverse direction of the vehicle body and a lower drain hole penetratively disposed downward.

8. The electric vehicle structure of claim 7, wherein:

each of the side sills has a cross-sectional structure having a plurality of ribs; and the side sill drain holes are disposed through all of the ribs of the respective side sill to allow the space between the upper and lower side walls of the floor panel to communicate with the lateral drain hole or the lower drain hole.

9. The electric vehicle structure of claim 7, wherein:

each of the side sills has a cross-sectional structure including a plurality of vertical ribs and a plurality of horizontal ribs;

an upper surface of a horizontal intermediate rib of the plurality of horizontal ribs is coupled to a lower surface of the lower side wall of the floor panel; and the side sill drain holes are disposed, in a horizontal direction, through the plurality of vertical ribs connected to the upper surface of the horizontal intermediate rib.

10. The electric vehicle structure of claim 1, wherein the floor panel has a structure that is elongated in a transverse direction of a vehicle body and that has a cross-sectional shape having a plurality of partition walls that connect the upper side wall and the lower side wall.

11. An electric vehicle structure comprising:

a floor panel comprising upper and lower side walls spaced apart from each other, the floor panel being configured to cover an upper side of a battery accommodation space;

side sills coupled to two opposite ends of the floor panel to define the battery accommodation space;

floor drain holes extending through the upper side wall of the floor panel; and side sill drain holes disposed in the side sills and configured to communicate with a space between the upper and lower side walls of the floor panel;

an integrated battery front cross member disposed at a front side of the floor panel and covering a front side of the battery accommodation space;

an integrated battery rear cross member disposed at a rear side of the floor panel and covering a rear side of the battery accommodation space; and a battery lower module disposed below the integrated battery front cross member, the integrated battery rear cross member, and the side sills and covering a lower side of the battery accommodation space.

12. The electric vehicle structure of claim 11, wherein the floor panel is configured by connecting a plurality of partial panels in a forward/rearward direction of a vehicle body, each partial panel comprising an extruded material.

13. The electric vehicle structure of claim 12, wherein:

the integrated battery front cross member is integrated with a foremost partial panel of the plurality of partial panels; and the integrated battery rear cross member is integrated with a rearmost partial panel of the plurality of partial panels.

14. The electric vehicle structure of claim 11, wherein the battery lower module comprises:

a lower plate configured to cover the lower side of the battery accommodation space;

a lower module outer peripheral front cross member coupled to an upper side of the lower plate and coupled to a lower side of the integrated battery front cross member;

a lower module outer peripheral rear cross member coupled to the upper side of the lower plate and coupled to a lower side of the integrated battery rear cross member; and a lower module outer peripheral side member coupled to the upper side of the lower plate and coupled to a lower side of the side sills.

15. The electric vehicle structure of claim 11, wherein the battery lower module is coupled in a state in which a gasket is interposed between the integrated battery front cross member, the integrated battery rear cross member, and the side sills.

16. The electric vehicle structure of claim 11, wherein the floor panel has a structure that is elongated in a transverse direction of a vehicle body and that has a cross-sectional shape having a plurality of partition walls that connect the upper side wall and the lower side wall.

17. The electric vehicle structure of claim 11, wherein at least one of the side sill drain holes communicates with an outside of a vehicle body.

18. The electric vehicle structure of claim 17, wherein a plurality of the side sill drain holes communicates with the outside of the vehicle body, and wherein the plurality of the side sill drain holes comprises a lateral drain hole penetratively disposed in a transverse direction of the vehicle body and a lower drain hole penetratively disposed downward.

19. The electric vehicle structure of claim 18, wherein:

each of the side sills has a cross-sectional structure having a plurality of ribs; and the side sill drain holes are disposed through all of the ribs of the respective side sill to allow the space between the upper and lower side walls of the floor panel to communicate with the lateral drain hole or the lower drain hole.

20. The electric vehicle structure of claim 18, wherein:

each of the side sills has a cross-sectional structure including a plurality of vertical ribs and a plurality of horizontal ribs;

an upper surface of a horizontal intermediate rib of the plurality of horizontal ribs is coupled to a lower surface of the lower side wall of the floor panel; and the side sill drain holes are disposed, in a horizontal direction, through the plurality of vertical ribs connected to the upper surface of the horizontal intermediate rib.

\*    \*    \*    \*    \*